(12) United States Patent
Baranowski

(10) Patent No.: US 6,813,608 B1
(45) Date of Patent: Nov. 2, 2004

(54) SYSTEM AND METHOD FOR ENHANCING USER EXPERIENCE IN A WIDE-AREA FACILITY HAVING A DISTRIBUTED, BOUNDED ENVIRONMENT

(75) Inventor: Robert Baranowski, San Diego, CA (US)

(73) Assignee: Park Tours, Inc., San Diego, CA (US)

( * ) Notice: Subject to any disclaimer, the term of this patent is extended or adjusted under 35 U.S.C. 154(b) by 0 days.

(21) Appl. No.: 09/525,340

(22) Filed: Mar. 14, 2000

Related U.S. Application Data

(60) Provisional application No. 60/158,725, filed on Oct. 11, 1999.

(51) Int. Cl.[7] .......................... G06F 17/60; G06F 17/00
(52) U.S. Cl. ............................................. 705/6; 705/5
(58) Field of Search ............................... 705/1, 14, 26, 705/27, 64, 5, 6

(56) References Cited

U.S. PATENT DOCUMENTS

| | | | | |
|---|---|---|---|---|
| 5,438,518 A | * | 8/1995 | Bianco et al. | 473/407 |
| 5,524,081 A | * | 6/1996 | Paul | 701/300 |
| 5,685,786 A | * | 11/1997 | Dudley | 473/407 |
| 5,689,431 A | * | 11/1997 | Rudow et al. | 701/213 |
| 5,797,809 A | * | 8/1998 | Hyuga | 473/407 |
| 5,810,680 A | * | 9/1998 | Lobb et al. | 473/407 |
| 5,873,068 A | * | 2/1999 | Beaumont et al. | 705/14 |
| 5,948,040 A | * | 9/1999 | DeLorme et al. | 701/201 |
| 6,091,956 A | * | 7/2000 | Hollenberg | 455/456.5 |
| 6,123,259 A | * | 9/2000 | Ogasawara | 235/380 |
| 6,204,813 B1 | * | 3/2001 | Wadell et al. | 342/463 |
| 6,314,406 B1 | * | 11/2001 | O'Hagan et al. | 705/14 |
| 6,327,570 B1 | * | 12/2001 | Stevens | 705/7 |
| 6,484,148 B1 | * | 11/2002 | Boyd | 705/14 |
| 2001/0045904 A1 | * | 11/2001 | Silzer, Jr. | 342/357.07 |
| 2002/0049535 A1 | * | 4/2002 | Rigo et al. | 701/211 |

* cited by examiner

Primary Examiner—James W. Myhre
(74) Attorney, Agent, or Firm—Steven L. Nichols; Rader, Fishman & Grauer PLLC

(57) ABSTRACT

A wireless system, including a system controller, and a portable device with wireless connection to the wireless system, can be used to link customers to the operations of a business. This link can be used to increase customer efficiency in the use of the business, including scheduling appointments to avoid lines, viewing customer locations on an interactive map, and tracking the locations of other customers traveling in a group. This link also allows the customer to initiate searches for information or products and to make electronic purchases. The business can use the link to send information or advertisements directly to select customers.

26 Claims, 6 Drawing Sheets

SYSTEM AND METHOD FOR ENHANCING USER EXPERIENCE IN A WIDE-AREA FACILITY HAVING A DISTRIBUTED, BOUNDED ENVIRONMENT

RELATED APPLICATIONS

The present application claims the priority under 35 U.S.C. § 119 of a previous provisional patent application, Application No. 60/158,725, filed Oct. 11, 1999 (incorporated herein by reference in its entirety).

FIELD OF THE INVENTION

The present invention relates to the fields of customer service, personal digital assistants (PDAs) and wireless communication systems. More specifically, the present invention relates to small wireless communication networks installed in places of business, entertainment, or education for enhancing the service provided to customers or visitors.

BACKGROUND OF THE INVENTION

A variety of businesses, entertainment facilities and educational facilities provide services to customers and other visitors throughout a wide physical area. This wide physical area may be a large single building, a complex of buildings or a facility spread over a number of square miles that includes indoor and outdoor, or just outdoor areas. Examples of such enterprises that provide entertainment, information, products or services to customers and other visitors in a geographically distributed or spread-out area include, but are not limited to, amusement parks, zoos, museums, shopping malls, national parks and monuments, historical sites, cruise ships, etc.

These enterprises, by their nature, must allow their customers or visitors to walk or move throughout their facilities. Unfortunately, due to the wide physical area of the facility, interfacing with the customer or visitor and providing adequate customer support is problematic. Most such wide-area enterprises currently provide little, or wholly inadequate, information to make the customer's experience while on-property more efficient and pleasant. In these environments, customers have resigned themselves to expect certain inconveniences. For example, waiting in a long line to ride an attraction at an amusement park or waiting in a long line to make purchases in a store has become commonplace.

Identifying locations and/or products within a wide-area facility also presents problems. For example, customers have accepted trying to find the location of an amusement park attraction or a store within a mall while reading a printed map or jostling with a number of other people to view a larger, posted map. With such arrangements, it may be difficult for a user to identify his or her present location on the map provided, particularly if the map is printed and not a fixed-position, posted map. Additionally, in larger stores, a customer may wander for a lengthy period of time looking for the product he or she needs.

Another problem that arises in wide-area facilities is the management of a group whose members have divergent interests. For example, in amusement parks, malls, and other similar geographically dispersed destinations, customers often travel in groups. At times, however, members of the group break off to see or use different elements of the facility or to move at a different pace. Once separated, members of the group have limited means for keeping track of each other and meeting back together.

Another problem retailers and amusement park operators have includes difficulties in relaying information to their customers. If an item is carried by a store and a customer cannot find it, a sale is lost. If a ride must be shut down due to maintenance or inclement weather, a misinformed customer may put blame on the amusement park.

Consequently, there is a need in the art for a method and system of providing enhanced customer service in a wide-area facility. Specifically, there is a need for better systems and methods of providing directional and product information to customers in a wide-area facility, preventing long lines for services within the wide-area facility and facilitating communication between separated members of a group making use of the wide-area facility.

SUMMARY OF THE INVENTION

It is an object of the present invention to address the above-described problems and others. Specifically, it is an object of the present invention to provide a method and system of providing enhanced customer service in a wide-area facility. More specifically, some of the objects of the present invention include providing a method and system of better providing directional and product information to customers in a wide-area facility, preventing long lines for services within the wide-area facility and facilitating communication between separated members of a group making use of the wide-area facility.

Additional objects, advantages and novel features of the invention will be set forth in the description which follows or may be learned by those skilled in the art through reading these materials or practicing the invention. The objects and advantages of the invention may be achieved through the means recited in the appended claims.

In a preferred embodiment, the present invention may be described as a system for supporting customer use of a wide-area facility which is under a common management or ownership. The system includes a plurality of transceiver bases distributed throughout the wide-area facility which is under common management or ownership; a system controller in communication with the transceiver bases; and at least one portable device carried by a customer who is using the wide-area facility, wherein the portable device communicates wirelessly with the plurality of transceiver bases so as to communicate with the system controller. The system controller transmits information about the wide-area facility to the portable device through the network of transceiver bases.

The system can assist the user in navigating the wide-area facility. Specifically, the system controller monitors the location of each portable device within the wide-area facility. Preferably, each portable device includes a display which displays the position of that portable device on an interactive map of the wide-area facility to facilitate navigation of the wide-area facility by the customer. The portable device may also display on the interactive map the location of a selected attraction or item within the wide-area facility. If the customer is visiting the wide-area facility with a group, e.g., a family unit, the portable device can be made to display the a position of one or-more other portable devices within the wide-area facility that are carried by members of the group which includes the customer.

The portable device of the present invention can also provide communication between portable devices. For example, the portable device preferably includes a user data entry device with which the customer can input a message for wireless transmission to the transceiver bases. The message is then retransmitted to another portable device carried by a designated message recipient within the wide-area facility.

The portable device of the present invention can also provide voice communications. For example, the portable device preferably includes an audio processing circuit, a microphone connected to the audio processing circuit, and a speaker connected to the audio processing circuit. The portable device then creates a two-way voice communication link between the portable device and another portable device in the wide-area facility using one or more of the transceiver bases to transmit voice data.

The portable device of the present invention can also be used to support customer purchasing within the wide-area facility. The portable device of the present invention preferably includes a user input device connected to a controller that is executing purchasing software. The user then makes purchases from the wide-area facility by authorizing a charge for a specified item with the user input device of the portable device. The authorization for the charge is processed by the purchasing software and communicated to the system controller.

The system of the present invention can further support customer purchases by customizing the advertising targeted at customers. Preferably, the system controller maintains a customer profile including demographic and preference information input by the customer and a record of purchases made by the customer from the wide-area facility. The system controller then transmits advertising or purchase offers to the portable device based on information from the customer profile.

In its preferred application, the present invention is used in an amusement or theme park to enhance customer experiences. In such an application, the system controller preferably maintains a schedule of reservations for the customer to use attractions of the park. The customer is then given preferential admission to an attraction at a time corresponding to that customer's reservation to use that attraction as recorded by the system controller.

The system controller is preferably connected to a web host so that customers can access the system controller over the Internet through the web host to generate a schedule of reservations to use the attractions of the park. Alternatively, the customer may communicate with the system controller using the portable device to create, edit or review the schedule of reservations.

Preferably, the system controller transmits reminders of reservations on the schedule to the portable device carried by the customer. The portable device may also display a suggested route from the customer's current location to the next attraction on the schedule of reservations. The route suggested may differ depending on the time of day or conditions or activities in the wide-area facility.

The present invention also encompasses the methods of making, installing and using the system described above. For example, the present invention expressly includes a method of supporting customer use of a wide-area facility which is under a common management or ownership by transmitting information about the wide-area facility to a portable device carried by a customer who is using the wide-area facility, where the portable device communicates wirelessly with a plurality of transceiver bases distributed throughout the wide-area facility which is under common management or ownership, and a system controller is in communication with the transceiver bases and transmits the information about the wide-area facility to the portable device using the transceiver bases.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained. In summary, the present invention provides a wireless communication system disposed throughout the premises of a wide-area facility. The wireless communication system communicates wirelessly with portable devices carried by customers or visitors within the facility to provide information, services and enhanced support of the customer's use of the facility.

As used herein, a wide-area facility is any commercial, recreational, educational, entertainment, historical, natural or other facility with premises that are physically dispersed so as to present problems to customers and visitors in finding their way around; locating the goods, services or attractions desired; or communicating with other members of their group. A wide-area facility may be a large single building, a complex of buildings or a facility spread over a number of square miles that includes indoor and outdoor, or just outdoor areas. Examples of such wide-area facilities include, but are not limited to, amusement parks, zoos, museums, shopping malls, national parks and monuments, historical sites, cruise ships, convention centers, etc.

Some such facilities will host "customers," while other such facilities may not require an admission fee and, therefore, host "visitors." As used herein, the term "customer" will be understood to refer to any person using a wide-area facility regardless of whether any commercial transaction occurs between that person and the facility.

Figure 1:
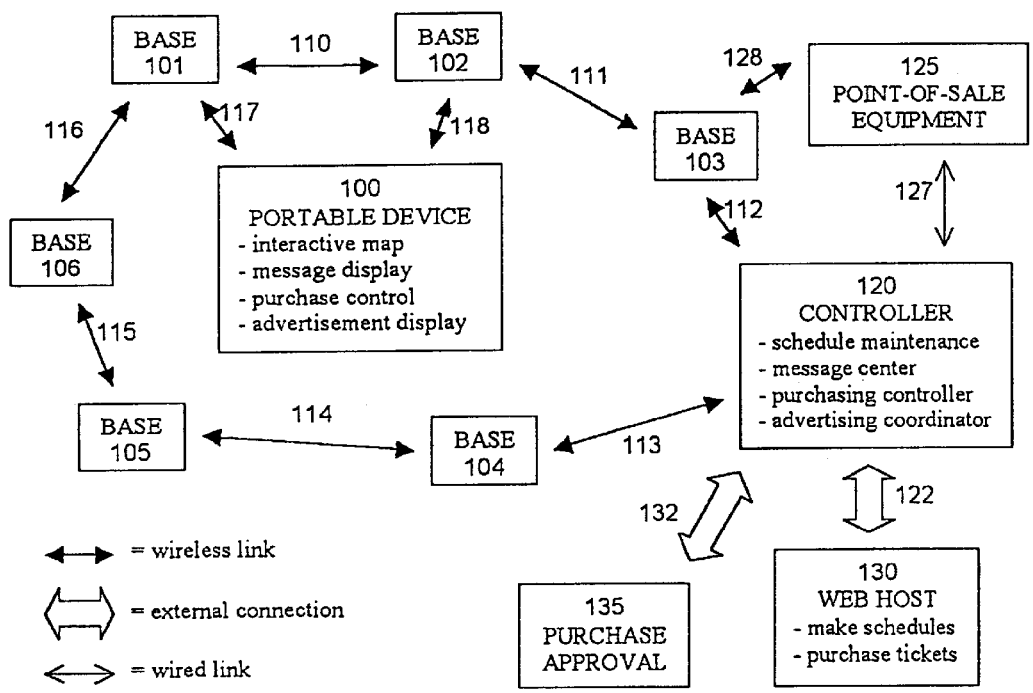
FIG. 1 shows a block diagram of a system embodied according to the present invention with an exemplary portable device illustrated within the coverage area.

As shown in FIG. 1, the primary interaction that a customer has with the system is through a portable device (100). As will be explained in detail below, this device (100) can allow a customer to determine his or her own location and obtain directions to an attraction, facility or product. The device (100) can also be used to communicate messages, either audio or visual, with others of the customer's group. The device (100) can also be used to manage the customer's schedule within the wide-area facility to avoid long lines. The device (100) may also allow the customer to make purchases or view advertisements, again, to avoid long lines at point-of-sale equipment.

The wireless system that the portable device (100) interacts with is made up primarily of a system controller (120) and a number of transceiver bases (101 to 106) dispersed throughout the wide-area facility. Communication between the portable device (100), controller (120), and the bases (101 to 106) is preferably wireless. For example, radio frequencies that are popular and inexpensive to implement are a preferred means of providing communication between the elements of the system (100, 120, 101 to 106).

Specifically, many manufacturers have been designing components for the ISM band. Competition in these parts has pushed the technology and driven down costs to make these components very attractive for use in a system according to the present invention.

Communications from the portable device (100) that are received by any of the base units (101 to 106) are sent to the controller (120) via communication links. As shown in FIG. 1, a preferred embodiment of the present invention calls for the base units (101 to 106) to communicate with each other as well as the portable device (100). In this arrangement, a communication to the controller (120) from the portable device (100) will be received by the base unit or units nearest the device (100) and then transmitted from base unit to base unit to ultimately reach the system controller (120).

An example of this preferred embodiment is shown in FIG. 1. The portable device (100) is located within communication range of base (101) and base (102). The communications links (117 and 118) between the portable device (100) and the respective base units (101 and 102) are wireless links, preferably radio frequency links.

Communications from the portable device (100) are thus received at the base units (101 and 102) and then transmitted over the intervening communications links (110, 111 and 112) to the controller (120) via any intervening base units (e.g., 103). Communication from the controller (120) to the portable device (100) is achieved in the same way along a reverse signal path. As will be appreciated by those skilled in the art, the links between the base units and/or the controller (110 to 116) could be wired links rather than wireless links.

The scheme illustrated in FIG. 1 is a point-to-point configuration, where each base (101 to 106) transmits messages to the assigned next base in the chain until communication with the controller (120) is achieved. Transmissions are repeated until acknowledged. A mesh network topology in which messages are passed from node to node and propagate across a physical network space based upon the location of each base (101 to 106) is preferred in this embodiment.

Alternatively, each base (101 to 106) could be linked directly to the controller (120), by wire or wirelessly, so that messages between the system and the portable device (100) go directly to or from the base unit or stations in range of the portable device (100) and the controller (120). In another alternative, network hubs (not shown) can be distributed throughout the coverage area, collecting messages and sending them directly to the controller (120). In such an arrangement, only the hub stands between each base (101 to 106) and the controller (120) in the communication chain.

The system controller (120) is similar in architecture to a portable device (100), but is a high-power, fixed system. The controller (120) runs software necessary to provide all the services available to the customer using the portable device (100). Examples of the services that can be provided by the system, including the controller (120) will be given below in the context of different types of wide-area facilities.

In summary, FIG. 1 illustrates an exemplary system embodied according to the principles of the present invention. It will be understood by those skilled in the art, that FIG. 1 illustrates a small-scale system of the present invention. It will be further understood, however, that the system of FIG. 1 can be adapted to any wide-area facility by increasing the scale of the system, e.g. providing a larger and more dispersed network of base units (101).

Figure 2:
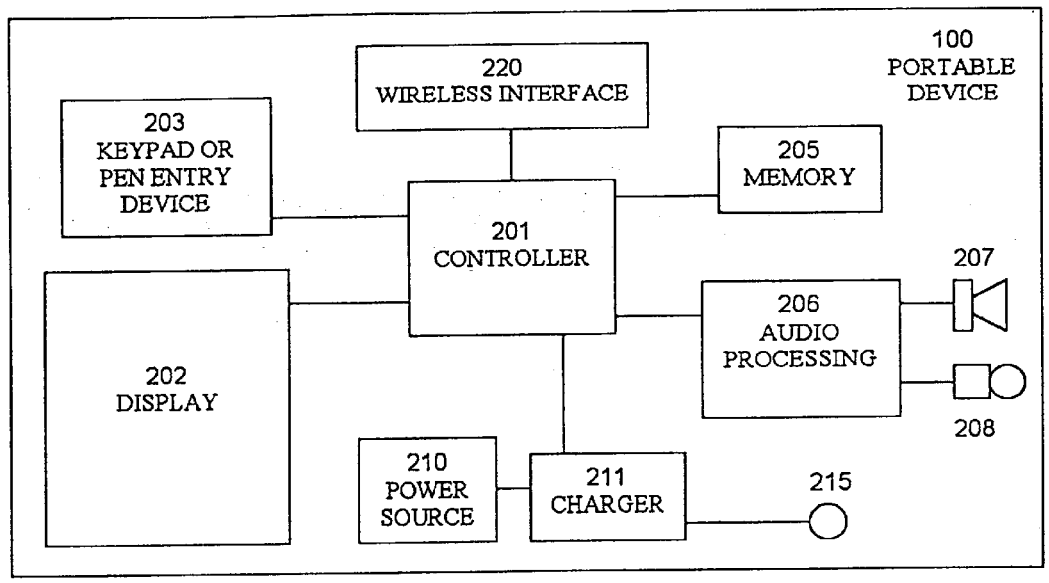
FIG. 2 shows a block diagram of a preferred embodiment for a portable device according to the present invention.

FIG. 2 shows an exemplary architecture of a portable device (100) according to the present invention. Portable device (100) can be embodied in a handheld or palm-size personal computer such as a personal digital assistant (PDA). The portable device (100) may be implemented as a stand-alone device, or as a part of another device that is carried by the user.

With reference to FIG. 2, all the functions of the portable device (100) are defined and executed by a controller or processor (201). A memory unit (205), preferably consisting of a mixture of volatile and nonvolatile storage, holds the executable program or programs, configuration information, and temporary data. The controller (201) controls the state and information passed through the wireless interface (220). This wireless interface is used to communicate with the bases (101 to 106), and, through those bases, with the system controller (120).

Customers interact with the portable device (100) and its controller (201) through its user interface, made up of a display (202), and a data entry device (203). Entry through device (203) can be touches on a touch-sensitive screen, manipulations of a trackball or touch pad, or keystrokes on a select numbers of keys. It is also possible that entry from a customer can be through voice commands passed through a voice recognition module in an audio processing block (206).

The portable device (100) may also be capable of sending and receiving audio messages or maintaining a continuous audio link. If this is the case, audio processing is done in the audio processing module (206), connected to a speaker (207) and a microphone (208). Alternate audio processing includes the voice command processing (mentioned above) and feedback or alert noises that accompany user input or attract user attention.

Power for the portable device (100) is stored by power storage device (210), preferably a battery of the latest technology. When connected to an external power source through connector (215), a charger (211) will recharge the power source (210).

Rather than provide an entirely new portable device (100), if a visitor to the wide-area facility has his or her own PDA, it may be possible and preferable to adapt the customer's PDA to function as the portable device (100) of the present invention. For example, a module (not shown) can be provided for connection to a customer's own PDA's. The module may provide all the software, firmware and hardware, including communications hardware, necessary to allow the customer's conventional PDA to function as the portable device (100) of the present invention.

Alternatively, if the customer's own PDA happens to contain all the necessary hardware to function as the portable device (100), under the principles of the present invention, software can be downloaded to the customer's PDA, at the wide-area facility or over a web host (130) on the Internet, so that the customer's PDA can become the portable device (100). The customer may be charged for renting or purchasing a portable device (100) or for obtaining a module or software upgrade to adapt an existing PDA for use as the portable device (100).

Figure 3:
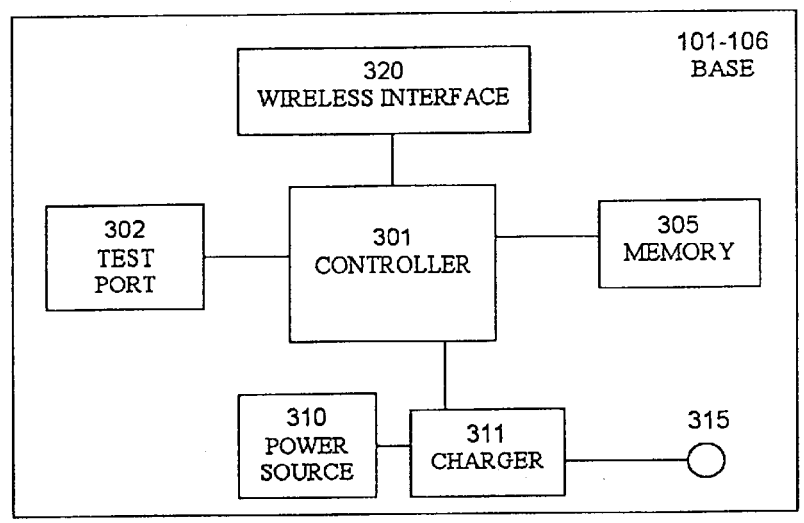
FIG. 3 shows a block diagram of a preferred embodiment for a wireless base unit according to the present invention.

FIG. 3 shows a preferred architecture for the wireless transmitter bases (101 to 106). The architecture is similar to the architecture of the portable device (100), with the user interface and audio processing block omitted.

A controller or processor (301) controls the state of the base and the messages that are passed therethrough. A memory unit (305) is provided which is preferably a combination of volatile and nonvolatile storage that holds the executable program or programs, configuration information, and temporary data used by the controller (301). A wireless interface (320) is used to send wireless messages to the portable devices (100), to the system controller (120), and/or to other bases (101 to 106).

A test port (302) may be provided for accessing the controller (301) to test the functioning of the base (101 to 106) or to facilitate the upgrading of programming in the memory (305). Alternatively, upgraded or additional software can be transmitted to a base (101 to 106) wirelessly by the system controller (120), or over any wireline link between the base (101 to 106) and the system controller (120). Upgraded or additional programming may be transmitted to any portable device (100) by the system controller (120) via the bases (101 to 106).

Power is provided to each base (101 to 106) through a connector (315), but an optional alternate power source (310) can be used to supplement external power. The alternate power source (310) can be a rechargeable temporary storage device, or can be a power-generating device that uses solar, wind, or water energy to generate power for the base (101 to 106). The alternate power source (310) may also be any combination of these power-storing or power-generating devices. In the case of a rechargeable storage device, a charger (311) recharges the device when external power is present through a connector (315).

Figure 3A:
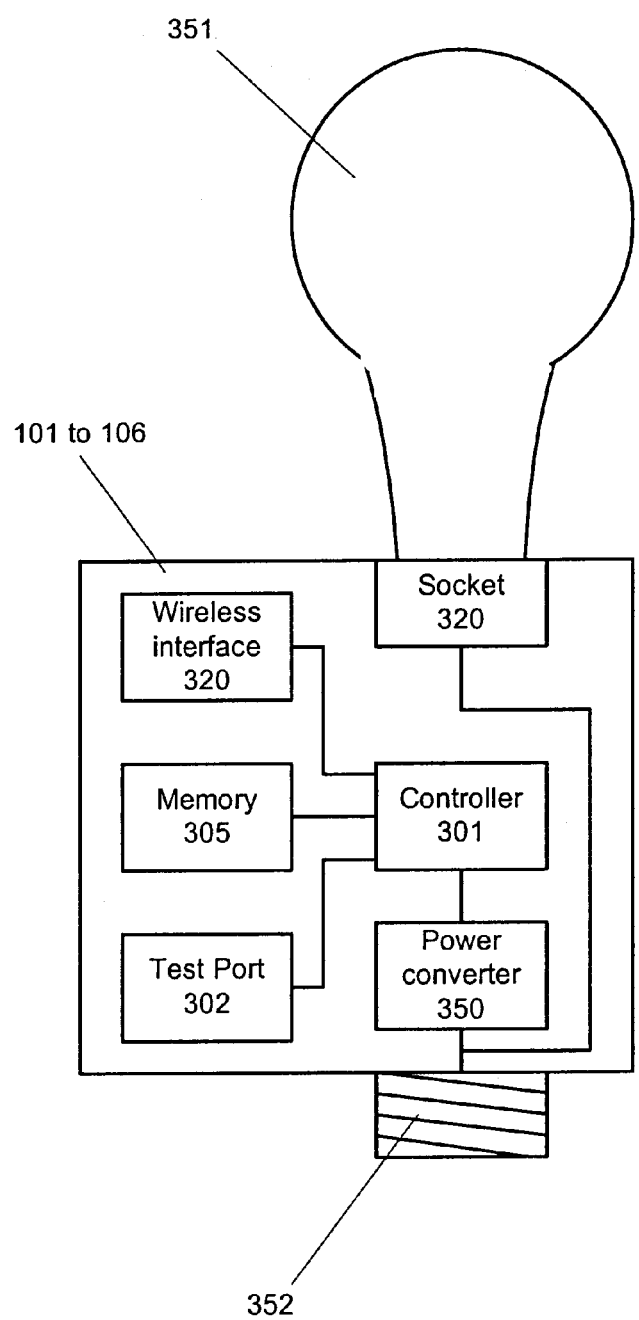
FIG. 3A shows a block diagram of a second preferred embodiment of a wireless base unit according to the present invention.

FIG. 3A illustrates a second preferred embodiment for a base (101 to 106) of the present invention. As shown in FIG. 3A, the base (101 to 106) can be implemented as a small unit that screws into a light bulb socket and draws power therefrom. The controller (301), memory unit (305), wireless interface (320) and test port (302) are the same as described above in connection with FIG. 3. However, the power source for the unit is provided by a threaded connector (352) sized to screw into a standard or non-standard light bulb socket and provide a connection between the AC power of the socket (not shown) and the base (101 to 106). A power converter (350) takes the AC power of the light bulb socket and converts it into power as required to power the controller (301) and the other components of the base (101 to 106).

The housing of the base (101 to 106), as illustrated in FIG. 3A, also includes a socket (320) into which a light bulb (351) can be screwed. The socket (320) is connected to the AC power provided through the connector (352) so as to provide power to light the light bulb (351). In this way, the base (101 to 106) can be readily installed and powered at any point where an existing light bulb and light bulb socket are located. Moreover, the light bulb can remain in place and continue to produce light by being connected to the bulb socket through the base (101 to 106) as shown in FIG. 3A.

Some of the applications of the system described above will now be explained. The system of the present invention can be used to perform a variety of functions to enhance and support customer experience in a wide-area facility. These functions and applications will be described below.

Many wide-area facilities allow the user to make purchases while on the premises. For example, a store or mall obviously offers a variety of goods to the customer. An amusement park may have food, beverage and merchandise outlets throughout the facility where customers may make purchases. Referring to FIG. 1, use of the system of the present invention to support customer purchases will be explained.

The controller (120) preferably provides a purchasing system connected with point-of-sale equipment (125). The link (127) between the controller (120) and the point-of-sale equipment (125) is preferably a wired communication link, and is preferably part of an Ethernet network. Alternatively, the communication link (127) between the controller (120) and the point-of-sale equipment (125) can also be wireless, e.g. through wireless link (112) to base (103), through base (103), and then through another wireless link (128).

The interaction between the point-of-sale equipment (125) and the controller (120) allows customers to purchase items, obtain more information about items for sale, view purchase totals, and obtain approval of credit for purchases. The controller (120), in addition to supporting these transactions, tracks the customer's identification and information along with pertinent information about purchases made. This information is stored by the controller (120) as part of that customer's demographics and preferences profile so that advertising can be more appropriately targeted to that customer based on known purchasing patterns and preferences.

Advertising or merchandise offers may be wirelessly transmitted from the controller (120) through the system illustrated in FIG. 1 to the user's portable device (100). This may alert the user to products, services, sales, offers, etc. available during his or her visit to the wide-area facility. Additionally, merchandise or services can be searched, and descriptions of items or services, video samples, and availability can be viewed using the portable device.

The portable device (100) is capable of displaying any type of advertisement that is sent to it by the controller (120). The controller (120) preferably selects advertisements to send based upon demographic data of the customer, preferences previously expressed by the customer, or previous purchases made by the customer. Advertisements provide an opportunity for the customer to purchase the advertised product by simply pressing a button. The product can either be picked up at a location within the wide-area facility, or the product could be sent to the customer's address on file or the customer's accommodations within the wide-area facility.

Purchasing software run by both the portable device (100) and the controller (120) is used to make transactions simpler by eliminating the exchange of cash or a credit or debit card. The transaction can be entirely electronic. The software in the portable device interfaces with the point-of-sale system through the controller. Through the controller's interface, the total purchase amount is transmitted, and the portable device (100) requests the transaction to be processed after final customer approval. Once approved, the controller (120) looks to see if a credit or debit account has been set up locally. If there is no local account, the controller (120) can connect to the place that holds the account, whether it is a bank for a debit account, or a creditor for a credit account. Once the controller gets approval of the transaction, the sale will be completed. The controller (120) connects to nationwide credit card approval sites (135) over a wired connection when a credit purchase approval is required.

The present invention can be used to assist a user in identifying his or her location within the wide-area facility and consequently navigating thorough the facility. For example, with reference to FIG. 1, the portable device (100)

maintains a communication link with one or more of the bases (101 to 106) in the system. In FIG. 1, the portable device (100) is within range of, and in communication with, two of the bases (101 and 102) using communication links (117 and 118), respectively. From identification of the bases (101 and 102), the portable device (100) and the system controller (120) can determine the rough location of the portable device (100) within the coverage area, i.e. the portable device (100) is in that portion of the coverage area known to be served by both base (101) and base (102). To further identify the location of the portable device (100), the bases (101 to 106) may measure the strength of the signal received from the portable device (100) to determine which base (101 to 106) is likely closest to the portable device (100) and, therefore, better represents the location of the portable device (100). Alternatively, the portable device may measure the strength of the signals from the bases (101 to 106) for the same purpose.

The portable device (100) can use this location determination for interactive mapping functions. In other words, the device (100) can display a map of the wide-area facility and indicate on that map the approximate location of the user as determined by which base or bases (101 to 106) the device (100) is in communication with. Thus, no matter where the user goes within the coverage area, the user can get a quick and accurate indication of his or her position relative to a map of the entire wide-area facility.

The location of any portable device (100) can also be determined by means other than the identification of the bases (101 to 106) that are within range of that portable device (100). In other embodiments, the location of a portable device (100) could be determined by a global positioning system (GPS), cellular E911, or other location technology that may be in existence now or in the future.

Once the system controller (120) has identified the user's location within the wide-area facility, the controller (120) can use that information to assist the user in navigating about the facility. Specifically, this electronic locating feature can help a customer find a desired attraction. The controller (120) can transmit, or the portable device (100) can store, a list of attractions in the wide-area facility. Using the data entry device (203), the user can search this list for an attraction of interest. Upon selecting the attraction of interest, the portable device (100) may highlight the attraction of interest on the interactive map and may even highlight a suggested route from the user's current location to the selected attraction.

Additionally, the user can use his or her portable device (100), which has an indication of the user's location, to identify amenities within the wide-area facility; for example, the nearest restroom or restaurant can be shown on the interactive map. The portable device (100) may have software allowing it to direct the user to the nearest restroom or other facility based on a location of the user as determined by the system. Alternatively, the portable device (100) may signal the system controller (120) for a determination of, for example, the closet restroom, restaurant, etc.

This interactive mapping feature can also help the user return to a location of interest which he or she does not have time to explore currently. The user accesses the interactive map of the portable device (100), which indicates the users' current location as precisely as possible. Using the data entry device (203), the user marks that current location on the interactive map so that he or she can return later when more time is available or an attraction is expected to be less busy with other customers.

This function can also be used to assist members of a group in maintaining contact and communication with each other. For example, the system controller (120) can keep track of the approximate locations of the members of an identified group and can transmit, via the bases (101 to 106) an indication of the location of each member of the group to all other members of the group. Consequently, the map of the wide-area facility on a parent's portable device (100) could indicate the approximate location of each child in the group who is also using a portable device (100). On the interactive map, all persons that are tracked preferably appear as icons as they move through the coverage area. Area alarms can be defined that alert the customers when the persons they are tracking enter into regions of the coverage area that are not desirable.

In addition to tracking the location of customers in the wide-area facility, the system of the present invention can also allow direct communication between customers in the facility. Built into the system is a messaging capability that allows messages to be sent from one portable device (100) to another. The message is sent from the portable device (100) of a first user, through the bases (101 to 106) to the controller (120). The system controller (120) can then retransmit the message to the portable device (100) of a designated recipient through the system of bases (101 to 106).

Each portable device (100) may be preprogrammed with a number of "canned" messages and answers that can be sent. For example, "Are you ready to leave?"; "Where are you?"; "Are you okay?"; "Want to eat?" may be preprogrammed messages that a user can quickly select and transmit from the portable device (100). These prepared messages may include text, graphic and or video elements. A corresponding preprogrammed set of responses could also be provided in the portable device (100) for responding to incoming messages, for example, "Yes"; "No"; "Not yet"; etc.

Each portable device (100) can maintain a list of these most frequently used messages. The messages are then displayed in a menu on the display (202) and selected for transmission to a designated recipient using the user interface (203). The list of members in a group may also be displayed as a menu so that the designated recipient can be similarly selected using the user interface (203). The customer also has the option of creating a custom message to send with the user interface (203). The user interface (203) can also be used to enter a recipient designation not listed in the recipient menu. This messaging can greatly assist customers in communicating with each other.

Additionally, the portable device (100) can use the interactive map described herein as part of a message. If, for example, the user of a portable device (100) wants to meet another user at a specified location in the wide-area facility, the first user can call up the interactive map on his or her portable device (100), indicate a location on the map at which to meet and send a custom or canned message (including the map with the designated meeting location indicated) to the portable device (100) of a designated second user with whom the first user wishes to arrange a meeting.

In another embodiment, the portable device (100) of the present invention may also provide a two-way voice link established between two portable devices. As shown in FIG. 2, each portable device (100) preferably includes a speaker (207) and a microphone (208) connected to an audio processing block (206). The user can speak into the microphone (208) and have his or her voice transduced into packets of voice data by the microphone (208) and the audio processing block (206). These packets can then be transmitted through the system to another portable device. At that device, the voice data packets are reprocessed by audio processing block (206) and output to that device's speaker (207) so as to be heard by the user of that receiving portable device.

If both devices are in communication with the same base (101 to 106), packets of voice data can be relayed from a first portable device, through that base, to a second portable device. For devices that are in communication with different bases, voice packets are passed from one base to the next until a base in radio contact with the other portable device is reached.

Since voice packets will be going from base to base in both directions, some knowledge of the path taken can be used to minimize system overhead. For example, referring to FIG. 1, if the voice packets are transmitted from base 101, those packets will be received by both base (102) and base (106). If the portable device of the intended recipient is in communication with base (103), base (102) should retransmit the voice packets to base (103) while base (106) should ignore the incoming voice packets. The best transmission paths are periodically updated to reflect changes in device location or system characteristics.

It may be necessary to minimize the demands on the system to limit two-way voice communications to a specified length of time, for example, ten seconds. Alternatively, there may be a button on the portable device (100) which must be depressed and held down while the user is speaking, like a conventional two-way radio. This will also help decrease the demands placed on the system by two-way voice data.

The communication features of the present invention can also be used for emergency management. For example, if a customer has an accident or medical emergency, a portable device (100) can be used to signal first-aid or emergency personnel both within the wide-area facility, if any, or in the vicinity of the wide-area facility. If there is a general emergency within a wide-area facility, the system controller (120) can address an open transmission to all portable devices (100) in the system to make an emergency public address warning of the emergency condition.

In high-end portable devices, according to the present invention, the communication features of the portable device (100) could also be linked to public phone lines or to a telephonic link via the Internet carried by a voiceover-IP (Internet Protocol) system. This will allow users within the wide-area facility to make and receive telephone calls using their portable device (100).

Figure 4:
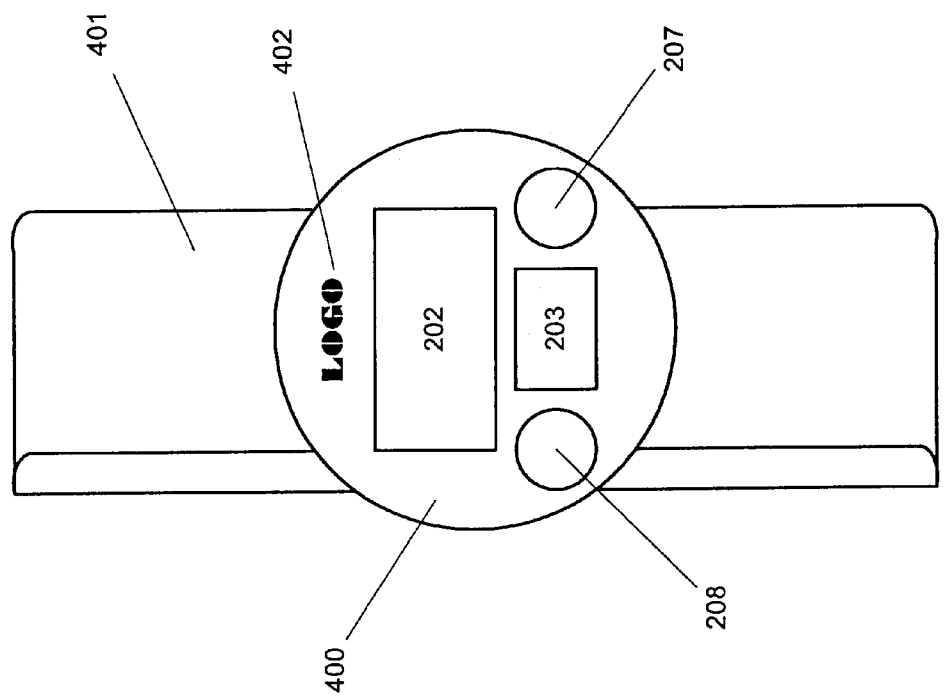
FIG. 4 illustrates another preferred embodiment of the portable device of the present invention.

FIG. 4 illustrates a preferred embodiment of the portable device of the present invention. As shown in FIG. 4, the portable device of the present invention can be incorporated into a device worn on the wrist, like a wristwatch. This embodiment may be particularly attractive to parents or guardians who wish their children to carry a portable device according to the present invention so as to maintain contact with that child, but who fear the child may well loose the device. With the portable device strapped to the child's wrist, the likelihood that the device will be misplaced is greatly decreased. Wearing the portable device of the present invention on one's wrist may also be a convenient feature for adults who don't want to be bothered by carrying, and potentially misplacing, the portable device.

A wrist-worn embodiment of the portable device of the present invention, as illustrated in FIG. 4, includes a housing (400) that is sized to be worn comfortably and conveniently on a person's wrist. A wristband (401) is used to secure the housing (400) to the user's wrist. The band (401) may be elastic or include a clasp for securing the band (401) around the user's wrist.

The housing (400) preferably contains all the elements of the portable device as illustrated in the block diagram of FIG. 2. The display (202) is preferable visible on a face portion of the housing (400). The user interface (203) including a keypad or the like is also preferably accessible on the face of the housing (400). The speaker (207) and microphone (208) for conducting wireless voice communication between portable devices (100) of the present invention may also be provided on the housing (400) of the device.

The wrist-worn portable device shown in FIG. 4 is preferably also capable of functioning as a wristwatch. The current time is shown on the display (202). Other common wristwatch features such as a display of the date, an alarm, a stopwatch, etc. may also be programmed into the device (100) and operated using the user interface device (203). Consequently, after the user has left the wide-area facility where the portable device functions as a communications and information device, the portable device can be used simply as a wristwatch and may serve as a souvenir of a visit to the wide-area facility. To facilitate this function, a logo or similar device (402) indicating the wide-area facility may be placed on the housing (400) as shown in FIG. 4.

As mentioned above, the system of the present invention can be used to enhance customer service and experience in a wide variety of different types of wide-area facilities. Examples in the area of commercial sales include large stores, wholesale outlets, and malls. Merchants in this market face the problem of getting customers attention as they are passing by and giving shoppers exactly what they need without overstaffing the store. The system of the present invention gives customers an interactive map to find the stores they are looking for. Using the messaging features of the system, a customer can search the mall or store database for a particular item, then be given directions on how to find and purchase the item.

Once purchase selections have been made, a customer can transfer account information to intelligent point-of-sale equipment and complete the transaction without handling any cash or credit or debit cards. This vertical market can be scaled down to small stores and restaurants as the equipment moves down the production cost curve. In the restaurant scenario, a customer could view menu selections on a portable device, make selections, check order status, and pay electronically.

Another application of the present invention includes places of information, such as museums, zoos, aquariums, historical sites, national monuments, libraries and the like. In these markets, there is a large amount of data on each item on display and very few opportunities to get that information to the customers viewing the items. Information transfer is usually limited to small text and graphic signs located near the display items, which are particularly inconvenient when large crowds of people are gathered around these signs. Also, some customers come to see particular items and may have a hard time finding where the specific item is located or on display.

The system of the present invention can provide customers with more information on the items they are standing in front of, in an audio, graphic or text format, and allows the customer to determine how much or how little information on a particular item is desired. This information is sent directly to the portable device (100) that the customers carry while in the wide-area facility. An interactive map can be displayed on the portable device to help customers find exactly what they are looking for, or even schedule up close appointments with particular display items as will be described in detail below.

The interactive map of the wide-area facility displayed on the portable device (100) can also be part of a graphical user interface (GUI) to facility the information retrieval function. For example, if the portable device (100) includes a touch sensitive screen, the customer can tap the location of the item being viewed to prompt the system controller (120) to transmit additional information about that exhibit. Alternatively, the user may operate a joystick, trackball, touch-pad or the like to move a mouse or cursor on the interactive map, tapping a selection key to indicate a desire for more information about an exhibit.

Other applications of the system of the present invention include cruise ships, resorts, airports, educational facilities, and university campuses. In all instances, the architecture and core technologies are the same, installed with the appropriate scale for the task.

Once the system has been deployed in a wide-area facility, it is thought that customers that take advantage of the service may pay a premium over the standard admission or purchase price. In other business model embodiments, customers may get a portable device (100) as part of an admission package, may borrow or rent the device from the facility, or may purchase it. In this event, a portion of the selling price, rental fee, or license fee may be used to fund subscribing establishments. If a customer gets a device, it can be used in the establishment that it was originally intended for or it can be used in any business that has deployed a similar system. The customer may subscribe to the service available across many businesses, with subscriptions being added upon request or terminated in the event that the subscriber does not satisfy the subscriber agreement.

A particularly significant application of the present invention is in amusement or theme parks. Most all the applications of the system described above are highly applicable to the amusement park application. For example, within the park, a user may use the interactive map to navigate around the park and locate other members of his or her group; the user may use the message and voice features to communicate with other members of his or her group in the amusement park; or the user may use the purchasing features to order food and beverages or to purchase merchandise; etc. Additionally, the system of the present invention can be advantageously used to prevent or avoid long lines for attractions at an amusement park.

Figure 5:
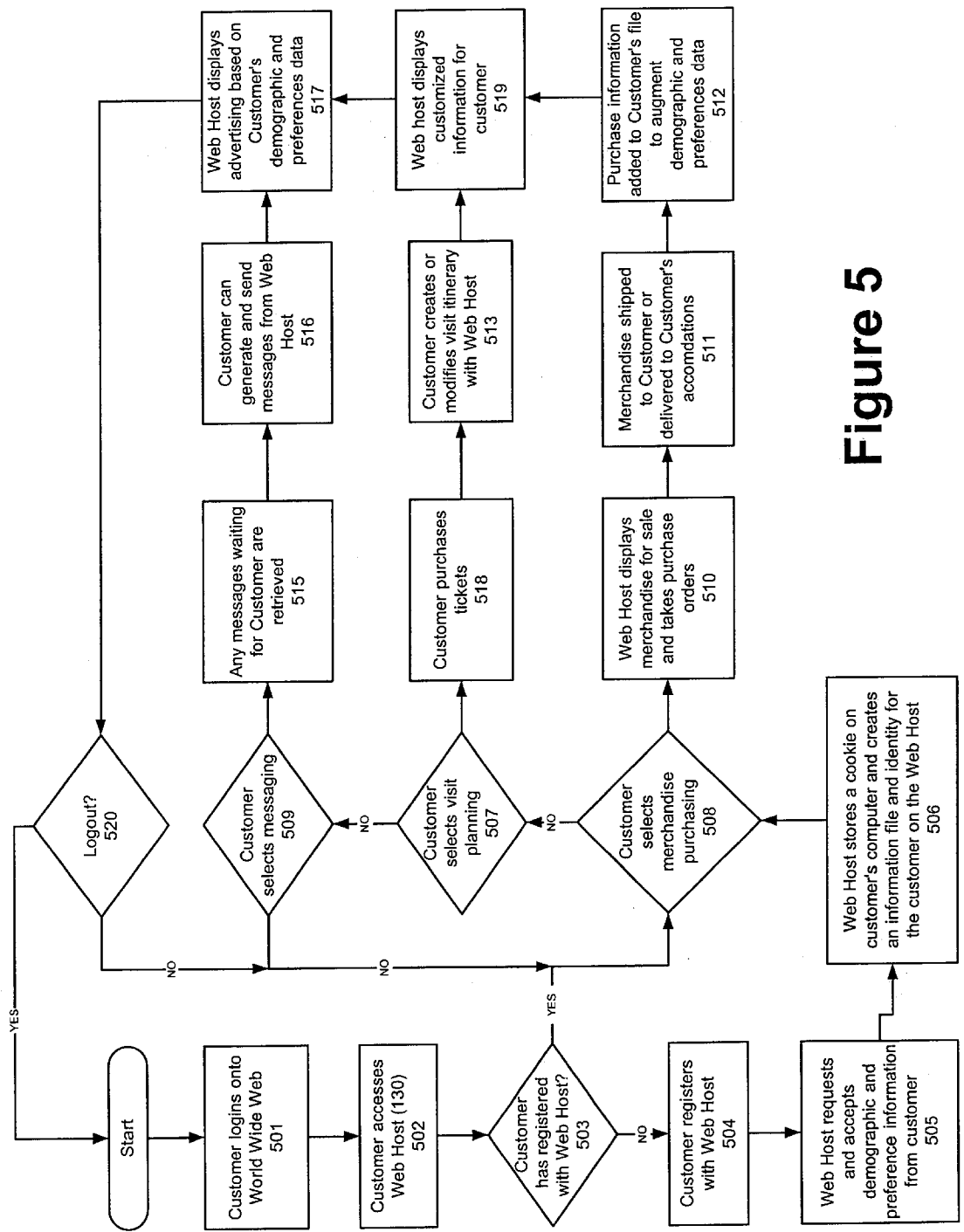
FIG. 5 is a flowchart explaining the use of the web host of according to the method of the present invention.

FIG. 5 outlines a method of using the system of the present invention to facilitate a visit to an amusement park or a similar wide-area facility with a number of available attractions which may be popular and generate patron lines. As shown in FIG. 1, the system controller (120) is connected via connection (122) to a web host (130). The web host (130) is a site on the Internet or World Wide Web that allows users to input information to and interact with the system controller (120) over the Internet.

As shown in FIG. 5, the customer planning a trip to the amusement park begins by logging on to the World Wide Web (501) and accessing the web host (130) (502). The customer can register, i.e. create an identity, on the web host (130). When the customer first connects to the web host (130), the host (130) will allow the user to identify himself or to create an identification (503). If no customer identity has been established previously, the customer registers with the web host (130) (504). The web host (130) preferably solicits demographic and preference information from the customer (505) that is used, as described above, to target appropriate advertising to that customer. The web host (130) may store a cookie file (506) on the user's computer to facilitate identification of that user when he or she next connects to the web host (130). The web host (130) also creates and stores a file of information about the customer and a customer identity that are maintained on the system controller (120) or web host (130) so that the customer can access his or her account on the system controller (120) from any Internet or web host (130) access terminal or from any access to the system controller (120), including a portable device (100).

After a user has registered with the web host (130) and logged on, the user can select from a number of services. For example, the customer may chose to purchase merchandise (508). The web host accordingly can display merchandise for sale and take purchase orders (510). The merchandise can then be shipped to the customer, held for pick-up when the customer visits the wide-area facility or delivered to the accommodations of the customer within the wide-area facility (511) at a specified time. Purchase information is added to the customer's profile to augment the demographic and preferences information gathered from the customer at registration (512).

The system may also provide the customer with personalized information (519). This information may include additional information or reviews about the products the customer has purchased and similar or related products that may have escaped the customer's attention. In fact, the web host (130) may then deliver any appropriate advertising to the customer's computer in accordance with that customer's profile (517).

The customer can then logoff (520) the connection to the web host (120). Alternatively, the customer can return to the purchase additional merchandise (508) or use one of the other features of the web host (120) such as the message feature described below.

While connected to the web host (120), the customer may also select a messaging feature (509). The web host (130) preferably runs messaging and e-mail software so that the customer can send or receive e-mail from the web host (130). Thus, the customer may check to see if any messages have been received (515). These messages may be e-mail messages received over the Internet. Additionally, messages generated by portable devices within the system and transmitted to the customer may be retrieved from the web host (130).

In application of the present invention, particularly in an amusement park, computer terminals may be located throughout the wide-area facility at which a user can access e-mail or check messages by connecting to the web host. The customer may also generate and send messages (516).

The web host (130) can also transmit incoming e-mail to the system controller (120) which, in turn, transmits the e-mail to the portable device (100) of the designated recipient. The portable device (100) could also be used to generate a reply or an initial e-mail that is transmitted to the system controller (120), the web host (130) and then the intended recipient over the Internet. However, a customer may prefer to find a full-size computer terminal within the wide-area facility to send and receive e-mail rather than work with the compact data entry unit (203) on the portable device (100).

Finally, the customer connected to the web host (130) can purchase tickets to the wide-area facility, make hotel reservations, arrange rental cars or courtesy transportation, etc. (518). In the case of an amusement park, in particular, the user connected to the web host (130), either remotely through the Internet, or at a computer terminal in the amusement park, can create a schedule of reservations to use the various attractions of the park (513). If the attraction being scheduled is a show or presentation, the reservation may be for a particular seat during a particular showing.

This is done by allowing the user to identify those attractions in the amusement park that he or she wishes to visit. The user may also specify which attractions are considered the most important. The controller (120) can then create a schedule for each attraction based on all the itineraries of all the visitors using the system that wish to reserve time at that attraction. The controller (120) may give preference in allocating reservations to customers making the earliest requests for reservations, i.e., first come, first served.

After the customer has made arrangements to visit the wide-area facility, the web host (130) may provide customized or personalized information to the customer (519). This information may include reviews or information about the attractions of the wide-area facility, particularly those that the customer has made reservations for, or similar attractions that may have escaped the customer's notice. This information may also include weather forecasts for the day of the customer's planned visit to the wide-area facility, industry news relevant to the wide-area and similar facilities, or any other information that may be useful to the customer.

If a customer has created a schedule of reservations for visiting the attractions of the wide-area facility, when the customer is then visiting the facility, the system controller (120) can transmit a reminder of the next attraction on the customer's schedule to the customer's portable device (100) and provide an interactive map showing a suggested route from the customer's current location to the attraction. The system controller (120) may also advise the customer of the approximate distance to the next attraction and may monitor the customer's distance from the attraction and transmit a warning if the customer moves too far from the attraction to reach the attraction in time for a scheduled reservation.

The controller (120) can also dynamically manage the reservations of customers to avoid lines and missed reservations. For example, as described above, the controller (120) monitors the approximate location of all the portable devices (100) in the wide-area facility. Consequently, if a customer's location is such that that customer cannot reasonably reach an attraction in time for a reservation at that attraction, the controller (120) can shift the customer's reservation into the future and advise the customer of the change by transmission to the customer's portable device (100).

To compensate for the shift, the controller (120) can also attempt to identify customer's with later reservations for the attraction who are close enough to reach the attraction earlier. The controller (120) may then signal that second customer and ask whether that second customer would be willing to use the attraction earlier than his or her scheduled reservation. With this dynamic scheduling feature, the controller (120) can better accommodate the whims and vagaries of customers using the reservation service of the wide-area facility.

Figure 6:
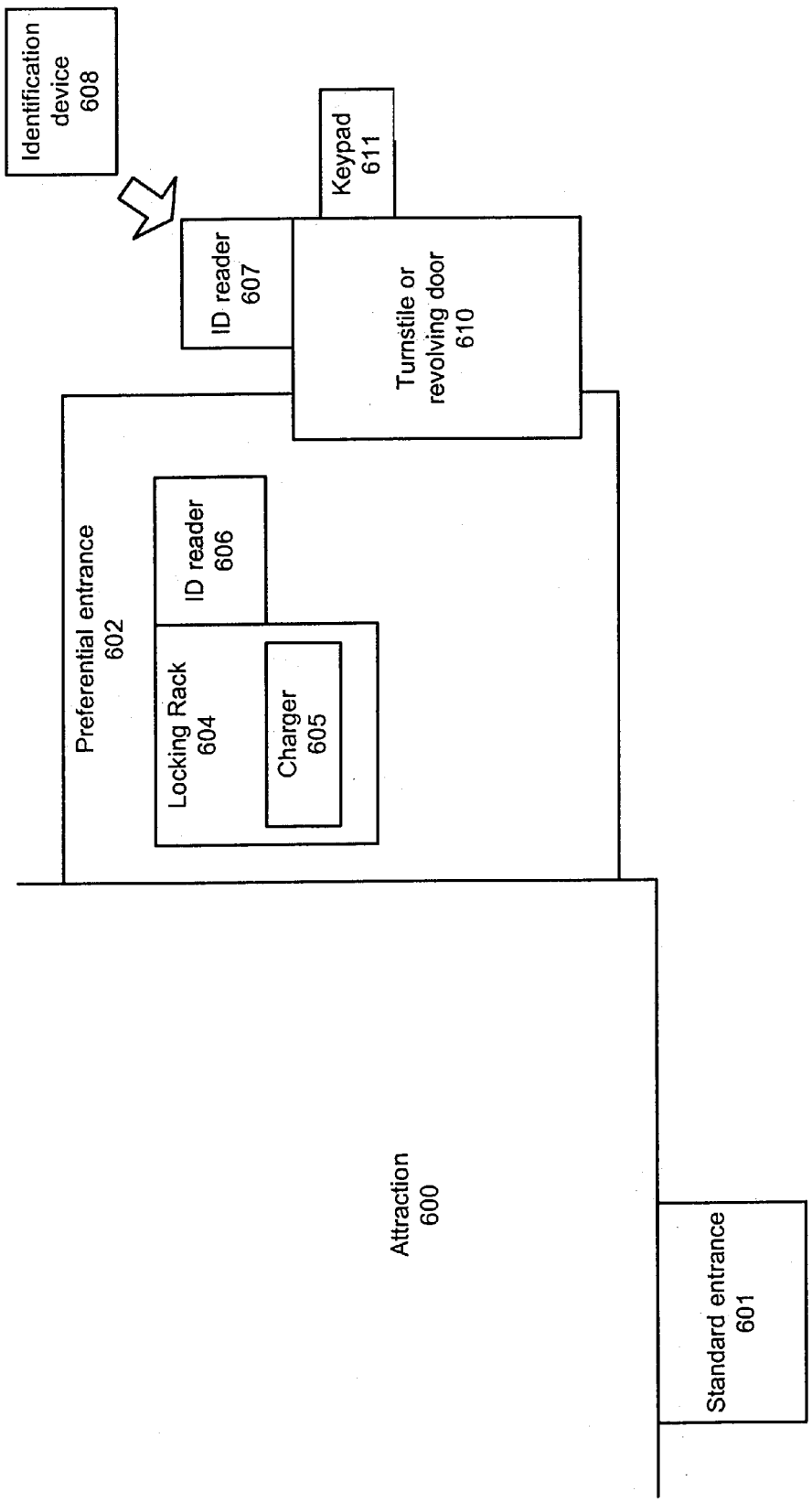
FIG. 6 is a block diagram of an entrance system for a wide-area facility attraction according to the present invention.

With reference of FIG. 6, when the customer arrives at the attraction (600), the customer may show the portable device (100) to an attendant to evidence the customer's reservation, whereupon the customer is immediately admitted to the attraction (600) through a preferential entrance (602) without waiting in a line. The customer with a reservation may be admitted ahead of a line of other customers who do not have a reservation and are waiting on the traditional first come, first serve basis for entry to the attraction through the standard entrance (601).

Alternatively, the customer could enter a code on a keypad (611) or the like to open a gate or operate a turnstile or revolving door (610) admitting the customer to the reserved attraction (600) while bypassing any existing line for that attraction. The entry code could be specific to that customer and assigned as part of the customer's registration with the web host (130). In such a case, the controller (120) could enable the gate or turnstile (610) to the attraction (600) to respond to the customer's code during a window of time, e.g., twenty minutes, corresponding to the customer's reservation for that attraction, e.g. ten minutes before and ten minutes after the time of the reservation. Alternatively, the code could be transmitted to the portable device (100) when the user needs it and could be different for each attraction and each customer at each time of entry.

Consequently, the system of the present invention can be used to avoid the problems experienced by visitors to a wide-area facility who would otherwise have to wait in long lines to visit the attractions of the facility. In this regard, it may be important to closely control the entry of visitors to an attraction through an entrance that bypasses any existing line. For example, the management of the wide-area facility would not want a single visitor to make reservations and pay the fees for a portable device (100) and then use his or her reservations to provide direct access to others who have not paid for this service.

Consequently, under the principles of the present invention, members of a group may share a portable device (100). However, some form of identification is provided to each of the members of the group, for which appropriate fees may be charged, that allow each member of the group to have preferential access to an attraction (600) based on the schedule of reservations associated with the group's portable device (100). Extending the examples given above, each member of the group may have a different identification or code that must be provided at the preferential entrance (602) to the attraction (600) so that the number of people admitted is consistent with the reservation made and the fees paid.

Alternatively, a physical form of identification (608) held may be held by each member of a group and shown to gain preferential admission based on an existing reservation. This physical form of identification (608) can take several equivalent forms under the principles of the present invention. For example, the identification device (608) might be a card incorporating a Subscriber Identity Module (SIM), i.e., a smart card that contains data identifying the user. This card is then interfaced with a card reader (607) at the preferential entrance (602) to the attraction (600) to operate, for example, a turnstile (610) admitting each individual member of the group to the attraction (600) at the time of that group's reservation. The SIM could allternatively be incoporated into a wristband, pendant or other device easily carried by the group members visiting the wide-area facility.

Alternatively, the identification (608) may incorporate a printed bar code, preferably on a wristband, pendant, card or other device easily carried. An optical bar code reader (607) would then be positioned at the preferential entrance (602) to the attraction to operate the preferential entrance, e.g. a turnstile or revolving door (610), in response to reading a bar code from a group member during, for example, a twenty minute window of time centered at the time of the reservation made by the group to visit that attraction (600).

The physical identification (608) could also include magnetic strip encoded to identify the members of a group. The magnetic strip could be, as above, placed on a card, wristband, pendant or the like and inserted in a magnetic strip reader (607) at the preferential entrance (602) to the attraction (600). The physical identification (608) could also be a proximity card or device which is sensed when placed in proximity to a sensor (607) at the preferential entrance (602). Any device capable of identifying the members of a group at a preferential entrance (602) so as to control the number of persons admitted in accordance with existing reservations and fees paid can be used under the principles of the present invention. However, some identification devices may have unobvious advantages over others.

While the customer is in the attraction (600), he or she may not want to carry the portable device (100), particularly if the attraction is, for example, a roller coaster or similar ride or requires the customer to be physically active. Consequently, the preferential entrance (602) may include a locking rack (604) in which the portable device (100) can be secured while the user is visiting the attraction (600). The rack (604) may be locked and opened using, for example, the identification device (608) of the customer. In such an embodiment, the rack (604) would incorporate a second identification reader (606) for reading the identification device (608) of the user. Moreover, the rack may incorporate an power source and charger (605) so that the portable device (100) can be charged while in the rack (604).

Using the portable device (100), the customer can also view his or her itinerary of scheduled attractions and see the time until the next or any subsequent reservation. The system may also allow a customer to schedule or edit reservations using his or her portable device (100). For example, if a customer sees an attraction that he or she wishes to visit, but the line to do so is prohibitive, the customer can access the system controller (120) using the portable device (100) and schedule a reservation at the next available time for that attraction. Additionally, if the customer begins to feel fatigued, the customer can use the portable device (100) to remove attractions from the schedule.

The interactive map of the wide-area facility displayed on the portable device (100) can be part of a graphical user interface (GUI) to facility this type of data entry. If the portable device (100) includes a touch sensitive screen, the customer can tap the location of the attraction on the interactive map that is to be added or deleted from the reservation schedule. Alternatively, the user may operate a joystick, trackball, touch-pad or the like to move a mouse or cursor on the interactive map, tapping a selection key to indicate an attraction to be added to, or deleted from, the reservation schedule.

Because the portable device (100), through the controller (120) and web host (130) is connected to the Internet, the user can also use the portable device (100) to access information available over the Internet, for example, weather forecasts, traffic reports, headline news, stock quotes, etc. The controller may limit the types of such information extracted from the Internet and repackage the information for easy display and retrieval on a portable device (100).

The portable device (100) of the present invention may also incorporate a digital camera. For example, an imaging device (such as a CCD camera) with suitable optics may be incorporated into the portable device (100) shown in FIG. 2. The controller (201) of the device (100) can process image signals from the camera and display the resulting images on the display (202). The customer can also upload the images to the Internet via the system controller (120) and web host (130). The images can then be e-mailed to friends and family of the customer who is visiting the wide-area facility.

Alternatively, the wide-area facility may also have photographic equipment in place to photograph visitors. For example, there may be photographic equipment in an attraction to photograph customers in the attraction. Alternatively, there may be stations at which employees or automatic equipment of the wide-area facility photograph customers. For example, employees of the facility may photograph children and other visitors with a mascot or character or with a site or background associated with the wide-area facility.

Any of these photographs can be electronically transmitted to the controller (120) by the equipment with which they were taken, for example, through the network of bases (101 to 106). The photographs can then be transmitted to the portable device (100) of the guest photographed so that that guest can review and purchase copies of the photographs as desired. The customer can transmit an order for copies of desired photographs with the portable device (100). The controller (120) may then charge the customer's account or credit card for the photographs and transmit an order for the photographs be prepared and provided for pick-up by the customer or shipped to an address specified by the customer. The customer can also send the picture by e-mail to a designated recipient using the e-mail features of the portable device (100) described above.

The present invention can also be used to assist in the management of a wide-area facility. For example, each employee can also be given a portable device (100) to use within the wide-area facility. The employer can then monitor the location of employees and have instant messaging or voice access to communicate with those employees. This employee-locating system can also be tied to time-clock and payroll systems. This function can also be used to gather information about the attractions or exhibits in the facility from the staff. This information could include break-downs, maintenance schedules, wait times for customers, etc. This information can then also be made available to customers through the system controller (120).

Because the system of the present invention, as illustrated in FIG. 1, is connected to the Internet via the web host (130), it is also possible to transmit information generated by the system of FIG. 1 to anyone connected to the Internet. For example, if a person associated with a person visiting the wide-area facility has an appropriate access code, that person can logon to the web host (130) via the Internet and access limited information about the person visiting the wide-area facility, for example, the current location of the customer within the wide-area facility as determined by the location of that customer's portable device (100).

The person connected to the system via the Internet can also send an e-mail to the person in the wide-area facility which will be transmitted to the portable device (100) of that person as described herein. If the person connected to the system via the Internet has the software and hardware to generate voice data for transmission over the Internet, voice messages and two-way voice communication can be created between the Internet surfer and the person visiting the wide-area facility via the system illustrated in FIG. 1.

The preceding description has been presented only to illustrate and describe the invention. It is not intended to be exhaustive or to limit the invention to any precise form disclosed. Many modifications and variations are possible in light of the above teaching.

For example, the principles of the present invention can be applied to manage lines for attractions in a wide-area facility without implementing the full wireless system described above. In a less expensive embodiment, visitors to a wide-area facility, such as an amusement park, could access a web host over the Internet prior to arrival at the park or could access an in-park reservation system upon arrival in order to create a reservation of times at which preferential access will be granted to attractions in the park. The management of these reservations and their generation could be accomplished precisely as described above.

However, rather than manage the reservation schedule with a portable device, the visitor to the amusement park merely prints or is given a printed schedule of the reservations. The visitor or group of visitors would also then be given a physical identification device as described above that could be used to operate a preferential entrance to an attraction at a time corresponding to that visitor's or group's reservation. If a bar code is used as the identification device, as described above, the bar code can be generated and printed on the visitor's schedule of reservations.

Several other alternatives are also within the scope of the present invention. For example, rather than carrying a printed schedule of the reservations, the visitor could be advised of the time and location of the next reservation each time he or she accesses an attraction for a present reservation. Additionally or alternatively, there may be terminals provided througout the wide-area facility at which a visitor who has paid for the service can check his or her reservation schedule and then visit attractions accordingly so as to eliminate the need for carrying a portable device.

The present invention can also be well adapted for use at a convention center, as mentioned above. Within a convention center, the portable device, with its interactive map feature, can be used to locate particular exhibitors or attractions on the convention floor. Moreover, in the context of a convention, the communication features of the system of the present invention could be used to transmit a request for additional information from any exhibitor or convention attendee. In response, an electronic brochure, for example, could be transmitted over the system and stored in the portable device of a convention attendee.

Additionally, an attendee could transmit information about himself or herself from the portable device to a particular exhibitor so as to be placed on a contact list and facilitate further communication between the exhibitor and that attendee. Attendees could also exchange personal or business information using the portable devices of the present invention to facilitate further contact after or during the convention.

The preferred embodiments have been chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for supporting customer use of a wide-area facility which is under a common management or ownership, the system comprising:

a plurality of transceiver bases distributed throughout said wide-area facility which is under common management or ownership;

a system controller in communication with said transceiver bases; and at least one portable device carried by a customer who is using said wide-area facility, wherein said portable device communicates wirelessly with said plurality of transceiver bases and said system controller;

wherein said system controller transmits information to said portable device about said wide-area facility; and wherein said system controller and said portable device maintain a schedule of reservations for said customer to use attractions of said wide-area facility.

2. The system of claim 1, wherein said system controller is connected to a web host so that customers can access said system controller over the Internet through said web host to generate said schedule of reservations to use attractions of said wide-area facility.

3. The system of claim 1, wherein said customer communicates with said system controller using said portable device to create, edit or review said schedule of reservations.

4. The system of claim 1, wherein said system controller transmits reminders of reservations on said schedule reservations to said portable device carried by said customer.

5. The system of claim 1, wherein said portable device displays a suggested route from said customer's current location to a next attraction on said schedule of reservations.

6. The system of claim 1, further comprising an identification device reader at a preferential entrance to an attraction for admitting a customer to said attraction at said time corresponding to that customer's reservation to use that attraction, said device reader admitting said customer to said attraction upon presentation of an identification device, readable by said device reader, that identifies said customer.

7. The system of 1, wherein said system controller determines a location of said portable device and compares said location to a time required to travel to an attraction for which a next reservation is listed in said schedule of reservations.

8. The system of claim 7, wherein said system controller contacts said customer through said portable device to change said next reservation if said time required to travel to that attraction exceeds a time before said next reservation.

9. The system of claim 1, wherein said wide-area facility is an amusement park and said attractions are attractions of said amusement park.

10. The system of claim 1, wherein said system monitors a location of said portable device; and said portable device volunteers information about said wide-area facility based on said location of said portable device.

11. The system of claim 10, wherein said portable device displays advertising based on said location of said portable device within said wide-area facility.

12. The system of claim 1, wherein said system monitors a location of said portable device; and said portable device volunteers information about said wide-area facility based on said location of said portable device and a schedule of attractions within said wide-area facility.

13. The system of claim 1, wherein said system monitors a location of said portable device and said schedule of reservations is adjusted based upon said location of said portable device.

14. The system of claim 1, wherein:

said portable device further comprises a user input device connected to a controller that is executing purchasing software, and said customer makes purchases from said wide-area facility by authorizing a charge for a specified item with said user input device of said portable device which is processed by said purchasing software and communicated to said system controller.

15. A system for supporting customer use of a wide-area facility which is under a common management or ownership, the system comprising:
   a plurality of transceiver bases distributed throughout said wide area facility which is under common management or ownership; and
   at least one portable device carried by a customer who is using said wide-area facility, wherein said portable device communicates wirelessly with said plurality of transceiver bases;
   wherein said portable device displays information about said wide-area facility or about goods, services, attractions, exhibits or amenities within said wide-area facility based on communication with said transceiver bases, including a map of said wide-area facility;
   wherein said system determines a current location of said portable device in said wide-area facility; and
   wherein, upon selection on said map of a particular point of said wide-area facility through a user interface of said portable device, said portable device determines and displays a suggested route to said particular point from said current location of said portable device;
   wherein said communication between said portable device and said transceiver bases identifies said current location of said portable device within said wide-area facility;
   wherein said portable device volunteers information about said wide-area facility based on said location of said portable device and a schedule of attractions within said wide-area facility that a user of said portable device has made.

16. A system for supporting customer use of a wide-area facility which is under a common management or ownership, the system comprising:
   a plurality of transceiver bases distributed throughout said wide area facility which is under common management or ownership; and
   at least one portable device carried by a customer who is using said wide-area facility, wherein said portable device communicates wirelessly with said plurality of transceiver bases;
   wherein said portable device displays information about said wide-area facility or about goods, services, attractions, exhibits or amenities within said wide-area facility based on communication with said transceiver bases, including a map of said wide-area facility;
   wherein said system determines a current location of said portable device in said wide-area facility; and
   wherein, upon selection on said map of a particular point of said wide-area facility through a user interface of said portable device, said portable device determines and displays a suggested route to said particular point from said current location of said portable device;
   wherein said portable device maintains a schedule of reservations for said customer to use attractions of said wide-area facility.

17. A system for supporting customer use of a wide-area facility which is under a common management or ownership, the system comprising:
   a plurality of transceiver bases distributed throughout said wide area facility, which is under common management or ownership; and
   at least one portable device carried by a customer who is using said wide-area facility, wherein said portable device communicates wirelessly with said plurality of transceiver bases;
   wherein said portable device displays information about said wide-area facility or about goods, services, attractions, exhibits or amenities within said wide-area facility based on communication with said transceiver bases, including a map of said wide-area facility;
   wherein said system determines a current location of said portable device in said wide-area facility;
   wherein, upon selection on said map of a particular point of said wide-area facility through a user interface of said portable device, said portable device determines and displays a suggested route to said particular point from said current location of said portable device;
   wherein said communication between said portable device and said transceiver bases identifies said current location of said portable device within said wide-area facility; and
   wherein said portable device maintains a schedule of reservations for said customer to use attractions of said wide-area facility, wherein said schedule of reservations is adjusted based upon said location of said portable device.

18. A system for supporting customer use of a wide-area facility which is under a common management or ownership, the system comprising:
   a plurality of wireless bases distributed throughout said wide-area facility which is under common management or ownership; and
   at least one portable device carried by a customer who is using said wide-area facility, wherein said portable device communicates wirelessly with said plurality of bases;
   wherein said system monitors a location of said portable device; and
   wherein said portable device volunteers information about said wide-area facility based on said location of said portable device and a schedule of attractions within said wide-area facility;
   further comprising a system controller in communication with said bases; wherein said system controller and said portable device maintain a schedule of reservations for said customer to use attractions of said wide-area facility.

19. A system for supporting customer use of an amusement park in which customers line up to experience various attractions of said amusement park, the system comprising:
   a plurality of transceiver bases distributed throughout said amusement park;
   a system controller in communication with said transceiver bases; and
   at least one portable device carried by a customer who is visiting said amusement park, wherein said portable device communicates wirelessly with said plurality of transceiver bases and said system controller;
   wherein said system controller and said portable device maintain a schedule of reservations for said customer to use said attractions of said amusement park.

20. The system of claim 19, wherein said system controller is connected to a web host so that customers can access said system controller over the Internet through said web host to generate said schedule of reservations to use attractions of said amusement park.

21. The system of claim 19, wherein said customer communicates with said system controller using said portable device to create, edit or review said schedule of reservations for said attractions of said amusement park.

22. The system of claim 19, wherein said system controller transmits reminders of reservations on said schedule of reservations to said portable device carried by said customer.

23. The system of claim 19, wherein said system monitors a location of said portable device in said amusement park.

24. The system of claim 23, wherein said portable device displays a suggested route from a customer's current location to a next attraction on said schedule of reservations.

25. The system of claim 23, wherein said schedule of reservations is adjusted based on said location of said portable device in comparison with locations of attractions on said schedule of reservations.

26. The system of claim 19, further comprising a preferential entrance to an attraction for admitting a customer to said attraction at a time corresponding to that customer's reservation to use that attraction.

* * * * *

UNITED STATES PATENT AND TRADEMARK OFFICE
CERTIFICATE OF CORRECTION

PATENT NO.    : 6,813,608 B1
DATED         : November 2, 2004
INVENTOR(S)   : Robert Baranowski It is certified that error appears in the above-identified patent and that said Letters Patent is hereby corrected as shown below:

Column 20,
Line 20, "The system of claim 1, wherein said system controller transmits reminders of reservations on said schedule reservations to said portable..." to -- The system of claim 1, wherein said system controller transmits reminders of reservations on said schedule of reservations to said portable... --
Line 33, "The system of 1, wherein said system controller..." to "The system of claim 1, wherein said system controller..."

Signed and Sealed this

Fourth Day of January, 2005

JON W. DUDAS
*Director of the United States Patent and Trademark Office*